US008660756B2

(12) United States Patent
Schrader

(10) Patent No.: US 8,660,756 B2
(45) Date of Patent: Feb. 25, 2014

(54) COLLISION MITIGATION SYSTEM

(75) Inventor: Michael A. Schrader, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 456 days.

(21) Appl. No.: 12/685,153

(22) Filed: Jan. 11, 2010

(65) Prior Publication Data

US 2011/0172882 A1   Jul. 14, 2011

(51) Int. Cl.
*G08G 1/16* (2006.01)
*B60R 19/24* (2006.01)

(52) U.S. Cl.
USPC ................................ 701/45; 701/41; 293/118

(58) Field of Classification Search
USPC ........... 701/36, 41, 43, 45–47, 32.2; 180/274; 293/9, 10, 21–26, 114, 118, 119, 129, 293/131, 134, 135, 137, 145, 150, 155
See application file for complete search history.

(56) References Cited

U.S. PATENT DOCUMENTS

| | | | | |
|---|---|---|---|---|
| 2,984,512 | A | | 5/1961 | Shaginaw |
| 3,799,597 | A | * | 3/1974 | Thompson ................... 293/137 |
| 3,820,834 | A | * | 6/1974 | Wilfert .......................... 293/150 |
| 4,003,594 | A | * | 1/1977 | Tommeraas .................. 293/131 |
| 4,408,790 | A | * | 10/1983 | Shimoda et al. ............. 293/122 |
| 5,016,933 | A | * | 5/1991 | Smit .............................. 293/117 |
| 5,997,058 | A | * | 12/1999 | Pedersen ...................... 293/102 |
| 6,019,419 | A | | 2/2000 | Browne et al. |
| 6,224,120 | B1 | | 5/2001 | Eipper et al. |
| 6,712,410 | B2 | * | 3/2004 | Kudelko et al. .............. 293/102 |
| 6,764,118 | B2 | | 7/2004 | DePottey et al. |
| 6,820,759 | B1 | * | 11/2004 | Schindler et al. ............. 213/221 |
| 6,825,756 | B2 | | 11/2004 | Bai et al. |
| 7,016,783 | B2 | * | 3/2006 | Hac et al. ...................... 701/301 |
| 7,109,854 | B2 | | 9/2006 | Dobler et al. |
| 7,232,002 | B2 | * | 6/2007 | Taya et al. .................... 180/274 |
| 7,478,849 | B2 | * | 1/2009 | Fortin ........................... 293/120 |
| 7,734,416 | B2 | * | 6/2010 | Yano et al. ..................... 701/301 |
| 7,810,437 | B2 | * | 10/2010 | Mattschull .................. 105/392.5 |
| 2004/0049331 | A1 | * | 3/2004 | Schneider ...................... 701/45 |
| 2004/0193374 | A1 | * | 9/2004 | Hac et al. ...................... 701/301 |
| 2005/0012317 | A1 | * | 1/2005 | Taya et al. .................... 280/784 |
| 2005/0110284 | A1 | * | 5/2005 | Browne et al. ............... 293/118 |
| 2007/0125589 | A1 | * | 6/2007 | Murphy ........................ 180/274 |
| 2008/0023954 | A1 | | 1/2008 | Eichberger et al. |
| 2008/0157547 | A1 | * | 7/2008 | Baumann et al. ............ 293/118 |
| 2008/0203744 | A1 | * | 8/2008 | Fortin ........................... 293/124 |
| 2009/0058109 | A1 | * | 3/2009 | Mattschull ................... 293/102 |
| 2009/0152041 | A1 | * | 6/2009 | Kim ............................... 180/274 |
| 2009/0152880 | A1 | * | 6/2009 | Donovan ......................... 293/4 |
| 2009/0195020 | A1 | | 8/2009 | Wang et al. |

FOREIGN PATENT DOCUMENTS

JP          2002240739        8/2002

* cited by examiner

*Primary Examiner* — Jason Holloway
(74) *Attorney, Agent, or Firm* — Rankin, Hill & Clark LLP

(57) ABSTRACT

A collision mitigation system for a vehicle has a frame assembly including a pair of frame members extending longitudinally along opposite lateral sides of a vehicle. A bumper beam extends across forward end portions of the pair of frame members. The bumper beam has a curved asymmetrical profile for guiding movement of the vehicle during a front-end offset crash event.

19 Claims, 4 Drawing Sheets

COLLISION MITIGATION SYSTEM

BACKGROUND

Exemplary embodiments herein relate to vehicles, and more particularly to a collision mitigation system and frame assembly.

For handling car-to-car frontal offset collisions, most current vehicles are designed such that the vehicle safety cage absorbs as much momentum as possible over the longest possible time span without allowing anything to intrude into the passenger cabin. This design methodology typically favors larger, heavier vehicles, as they tend to continue forward after colliding with smaller vehicles. This reduces the amount of momentum that must be absorbed. Unfortunately, the smaller vehicle tends to move backward after these crashes, which increases the amount of momentum that these vehicles must absorb.

By way of example, a small vehicle can go from 40 mph to −5 mph in a very short period of time after a frontal offset collision, while a larger vehicle can go from 40 mph to 5 mph in a slightly longer span due to the length of the front-end crumple zone on a larger vehicle. This is often one of the reason that larger vehicles tend to do better in these types of crashes and the crash tests corresponding thereto. Unfortunately, one of the leading causes of injury and death in this type of collision is the sudden change in momentum. This sudden change in momentum can cause severe injury to the vehicle occupant. A primary goal of vehicle safety cage design is currently to maximize the time over which such momentum is absorbed thereby minimizing the initial impact on the vehicle occupant. However, as the current trend is toward smaller and smaller vehicles, new design methodologies are needed to improve frontal offset crash protection in small cars.

BRIEF DESCRIPTION

According to one aspect, a collision mitigation system for a vehicle has a frame assembly including a pair of frame members extending longitudinally along opposite lateral sides of the vehicle and a bumper beam extending between forward end portions of the pair of frame members. The bumper beam has a curved asymmetrical profile for guiding movement of the vehicle during a front-end offset crash event.

According to another aspect, a collision mitigation system for redirecting collision energy includes first and second spaced apart frame members extending longitudinally along opposite lateral sides of a vehicle. An asymmetrical bumper beam extends across forward ends of the first and second spaced apart frame members. The asymmetrical bumper beam is configured to redirect collision energy away from the vehicle during a front corner to front corner collision event between the vehicle and another vehicle.

According to still another aspect, a collision mitigation system for a vehicle includes an asymmetrical bumper beam extending between forward ends of laterally spaced apart frame members. The asymmetrical bumper beam is configured to redirect collision energy away from the vehicle during a front corner to front corner collision event between the vehicle and another vehicle. An active pusher assembly has a moveable pusher member that is selectively moveable between a rest position and a protruding position wherein the pusher member protrudes from the bumper beam. At least one steerable wheel is rotatably connected to at least one of the frame members. A powered steering unit is provided for power steering of the at least one steerable wheel. A detection system is provided for detecting the collision event. A controller is operatively connected to the power steering unit, the active pusher assembly and the detection system. The controller is configured to command a power steering unit to steer the at least one steerable wheel away from the collision event and to command the active pusher assembly to move the pusher member to the protruding position when the detection system detects the collision event.

DETAILED DESCRIPTION

Figure 1:
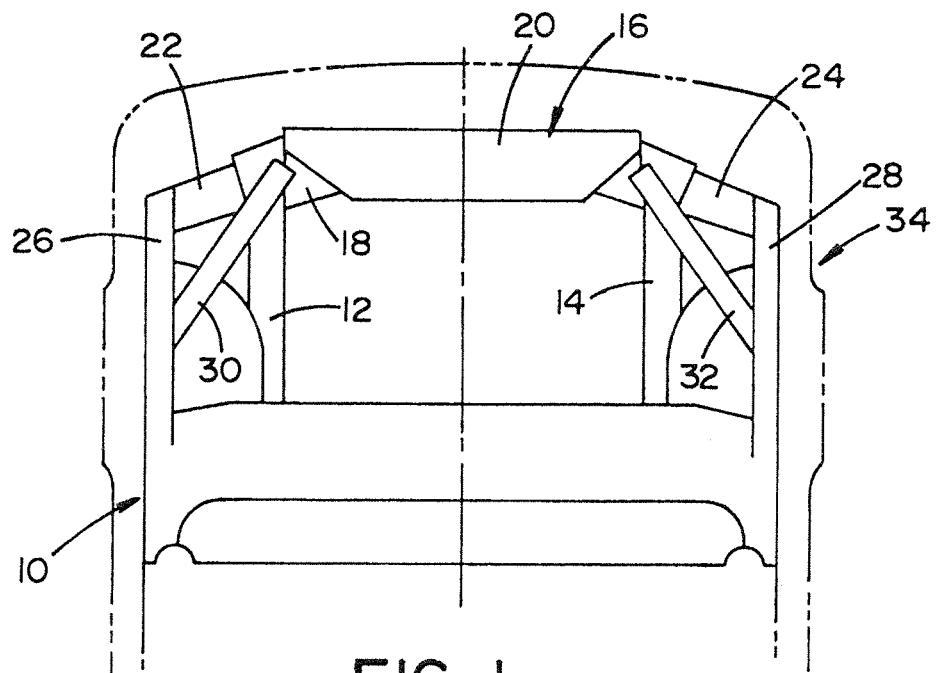
FIG. 1 is schematic view of a prior art front end portion of a vehicle frame assembly having a symmetrical profile.

Referring now to the drawings, wherein the showings are for purposes of illustrating one or more exemplary embodiments and not for purposes of limiting same, FIG. 1 illustrates a prior art frame assembly 10 for a vehicle 34. In particular, the illustrated frame assembly 10 is a front frame assembly including a pair of spaced apart side frame members 12, 14 extended longitudinally along opposite sides of the vehicle 34 and a bumper beam 16 extended between forward end portions of the frame members 12, 14. The illustrated bumper beam 16 of the prior art frame assembly 10 has a symmetrical profile along its longitudinal length.

In particular, the bumper beam 16 includes a center portion 18 spanning between the frame members 12, 14. A reinforcing structure or bulkhead 20 can be secured to the center portion 18 as shown. The bumper beam 16 can further include lateral portions 22, 24 flanking the center portion 18. Specifically, the first lateral portion 22 can extend laterally outward from the center portion 18 and from about a location where the frame member 12 connects to the bumper beam 16. Likewise, the second lateral portion 24 can extend laterally outward from the center portion 18 and from about a location where the frame member 14 connects with the bumper beam 16. Body side members 26, 28 can connect to distal ends of the lateral portions 22, 24 and can extend longitudinally rearwardly therefrom. Angled supports 30, 32 can connect the body side members 26, 28 at locations spaced rearwardly from the bumper beam 16 to the bumper beam 16 at approximately the locations where the side frame members 12, 14 connect to the bumper beam 16.

One problem with the illustrated frame assembly 10 is that it is not optimized to handle front offset collisions when the vehicle 34 is smaller vehicle colliding with a larger vehicle. Instead, the frame assembly 10 will tend to absorb as much momentum as possible over the longest time span possible while preventing any frame components from intruding into the passenger cabin. This construction can be problematic when the vehicle 34 is involved in a collision, particularly a front offset collision, with another larger and/or heavier vehicle. In such a case, significant amounts of momentum are absorbed by the vehicle 34, which can cause severe injury to occupants of the vehicle 34.

Figure 2:
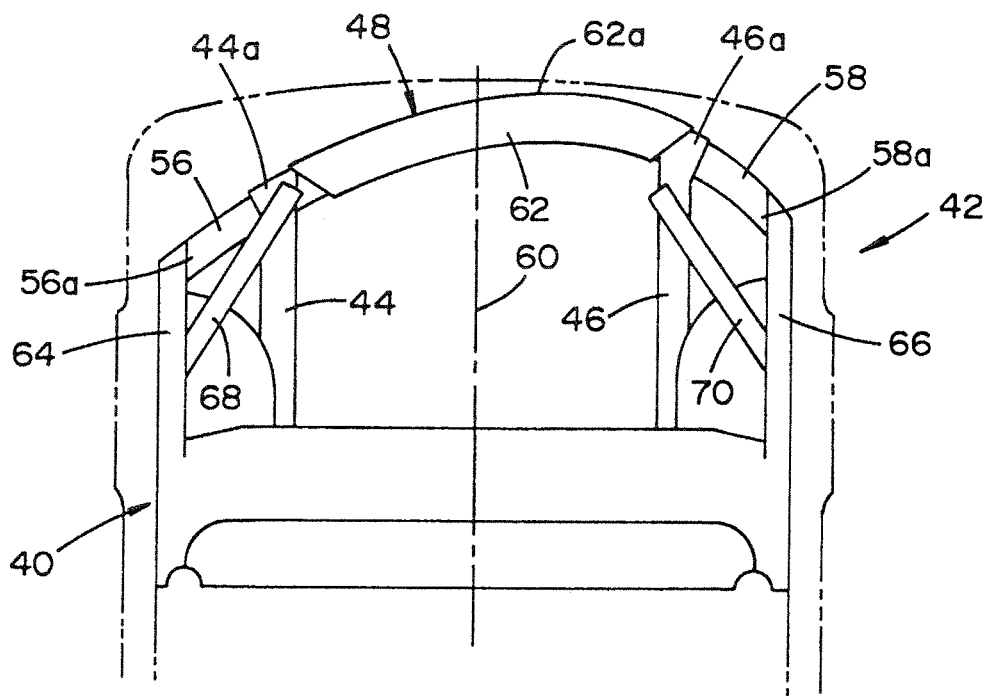
FIG. 2 is schematic view of a front end portion of a vehicle frame assembly having an asymmetrical profile.

With reference now to FIG. 2, a collision mitigation system for redirecting collision energy will now be described in connection with vehicle 42. The collision mitigation system of the illustrated embodiment includes a frame assembly 40 having a pair of spaced apart side frame members 44, 46 extending longitudinally along the opposite lateral sides of the vehicle 42. The frame assembly 40 also includes a bumper beam 48 extending between forward end portions 44a, 46a of the side frame members 44, 46. As shown, the bumper beam 48 has a curved asymmetrical profile for guiding movement of the vehicle 42 during a front-end offset crash event.

With its asymmetrical profile, the bumper beam 48 can be described as an asymmetrical bumper beam, which extends across forward end portions 44a, 46a of the side frame members 44, 46. As will be described in more detail below, the asymmetrical bumper beam 48 is configured to redirect collision energy away from the vehicle 42 during a front corner to front corner collision event between the vehicle 42 and another vehicle (e.g., vehicle 50 of FIG. 3). In the illustrated embodiment, the bumper beam 48 includes a first lateral portion 56 adjacent a first one of the pair of side frame members 44, 46 (i.e., adjacent side frame member 44) and a second lateral portion 58 adjacent a second one of the side frame members 44, 46 (i.e., side frame member 46). As part of the asymmetrical profile of the bumper beam 48, the first lateral portion 56 is spaced rearwardly relative to the second lateral portion 58 (e.g., along a longitudinal axis or center line 60 of the vehicle 42). Accordingly, the first lateral portion 56 is longitudinally spaced behind the second lateral portion 58. In particular, an outer lateral end 56a of the first lateral portion 56 is longitudinally recessed along a longitudinal axis (e.g., center line 60) relative to an outer lateral end 58a of the second lateral portion 58.

The bumper beam 48 defines or has an apex portion 62 disposed between the lateral portions 56, 58 that is offset laterally from or relative to the longitudinal center line 60 of the vehicle 42. Specifically, the apex portion 62 can span between the first and second lateral portions 56, 58. The apex portion 62 has an apex 62a that is offset laterally from or relative to the longitudinal center line 60. In one embodiment, the apex portion 62, and particularly the apex 62a thereof, is offset laterally in a direction away from a driver's side of the vehicle. More specifically, the apex 62a of FIG. 2 is shown to the right of the center line 60 and in this embodiment the driver's side of the vehicle 42 would be to the left of the center line 60. For right-hand drive vehicles, the configuration illustrated in FIG. 2 could be reversed such that the apex 62a would be provided to the left of the center line 60 and the driver's side could be provided to the right of the center line 60.

The outer lateral ends 56a, 58a of the lateral portions 56, 58 can be connected to body side members 64, 66. Angled support members 68, 70 can extend from the body side member 64, 66 at locations spaced rearwardly relative to the outer lateral ends 56a, 58a of the lateral portions 56, 58 to the bumper beam 48 and particularly at approximate locations where the side frame members 44, 46 connect to the bumper beam 48 (or adjacent these locations). As shown, the first lateral portion 56, which extends from one end of the apex portion 62, has a shallow angle or a larger radius of curvature and the second lateral portion 58, which extends from another end of the apex portion 62, has a steep angle or a smaller radius of curvature, particularly relative to one another. Also as shown, the first lateral portion 56 is directed laterally into the vehicle 42 at a greater angle than the second lateral portion 58 is directed laterally into the vehicle 42. More specifically, in the illustrated embodiment, the first lateral portion 56 is directed laterally into the vehicle 42 at an angle between about 50 to about 60 degrees and the second lateral portion 58 is directed laterally into the vehicle at an angle of about 42 to about 50 degrees. More specifically still, in the illustrated embodiment, the first lateral portion 56 is directed laterally into the vehicle 42 at an angle of about 55 degrees and the second lateral portion 58 is directed laterally into the vehicle 42 at an angle of about 45 degrees.

Figure 3:
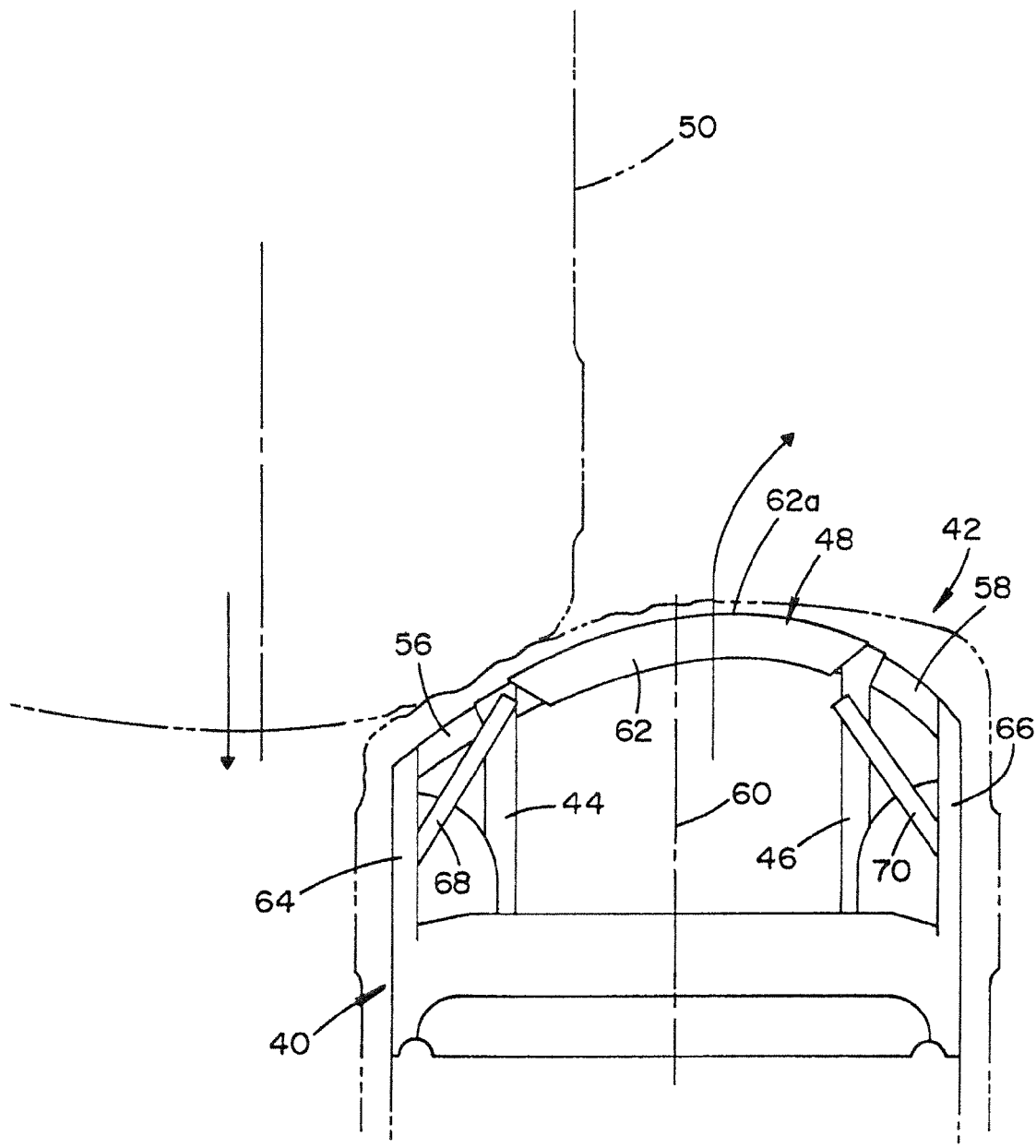
FIG. 3 is a schematic view of a collision event between the front end portion of FIG. 2 and another vehicle showing the asymmetrical profile guiding movement of the collision event.

With additional reference to FIG. 3, the collision mitigating frame assembly 40 can facilitate two vehicles (e.g., vehicle 42 and vehicle 50) sliding past one another during a front-end offset crash event. This can advantageously allow both vehicles 42, 50 to maintain some forward speed and momentum and thereby reduce the amount of an inertia to be absorbed. Further, this can occur even if one of the vehicles, such as vehicle 42, is smaller relative to the other vehicle 50. The asymmetrical profile of the bumper beam 48 on the vehicle 42 is particularly configured to deal with the type of frontal offset crash events depicted in FIG. 3, which is a highly common type of frontal offset crash (i.e., both drivers' sides of the crashing vehicles contacting one another for left-hand drive vehicles). Guiding movement of the crashing vehicles 42, 50, and particularly facilitating the vehicles 42, 50 sliding past one another, can mitigate collision damage and injuries to vehicle occupants, particularly as compared to frontal offset collisions where two vehicles 42, 50 impact one another and "lock" together after the collision. Instead of absorbing energy during the collision, the asymmetrical bumper beam 48 advantageously redirects the energy of the collision (e.g., the crushing body panels of the vehicles or the now exposed components under the body panels can lock together). This encourages the vehicles 42, 50 to slide past one another rather than locking up with one another.

Figure 4:
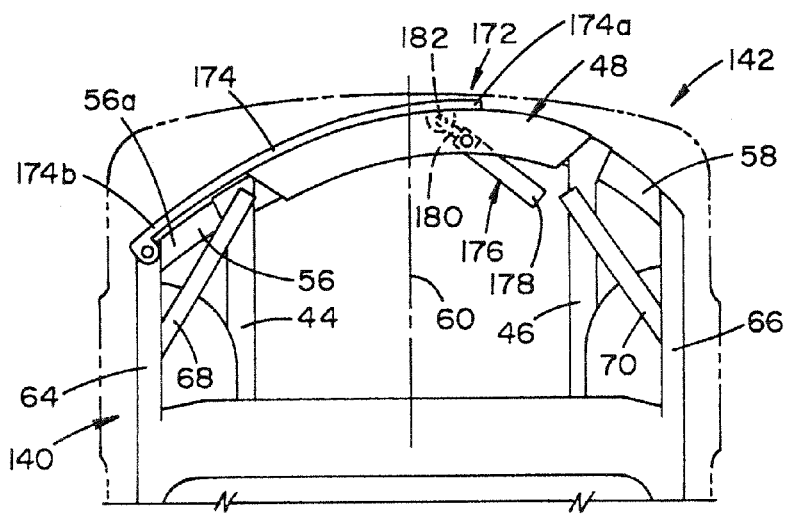
FIG. 4 is a schematic view of a front end portion of a vehicle frame assembly having an asymmetrical profile and an active pusher system.
Figure 5:
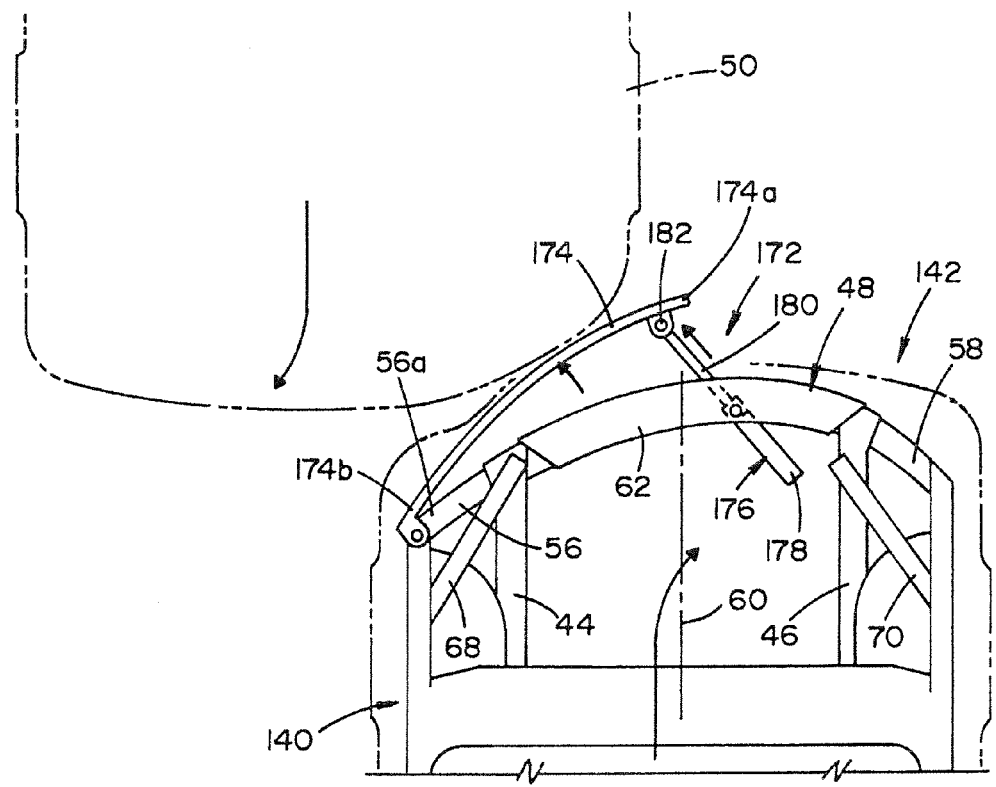
FIG. 5 is a schematic view of a collision event between the front end portion of FIG. 4 and another vehicle showing the asymmetrical profile and the active pusher system guiding movement of the collision event.

With reference to FIGS. 4 and 5, a collision mitigation system for redirecting collision energy includes a collision mitigating frame assembly 140 for a vehicle 142 according to another exemplary embodiment. Except as described hereinbelow, the collision mitigation frame assembly 140 of FIGS. 4 and 5 can be the same as the collision mitigating frame assembly 140 of FIGS. 2-3 and thus like reference numerals are used to identify like components. For example, the frame assembly 140 includes first and second spaced apart side frame members 44, 46 extending longitudinally along opposite lateral sides of the vehicle 142. The frame assembly 140 also includes asymmetrical bumper beam 48 extending across forward ends of the first and second spaced apart frame members 44, 46. As already described herein, the asymmetrical bumper beam 48 is configured to redirect collision energy away from the vehicle 142 during a front corner to front corner collision event between the vehicle 142 and another vehicle, such as vehicle 50 of FIG. 5.

Unlike the frame assembly 40, the frame assembly 140 further includes an active pusher assembly 172 including a pusher member 174 moveably attached to the bumper beam 48 for moving toward a protruding position during a crash event, particularly a front-end offset crash event, to push away the impacting vehicle, such as vehicle 50 in FIG. 5. In particular, the pusher member 174 is selectively moveable between a rest position (shown in FIG. 4) and the protruding position (shown in FIG. 5) wherein the pusher member 174 protrudes from the first lateral portion 56 and an adjacent portion of the apex portion 62 so as to be oriented at an angle relative to a lateral axis across the vehicle. In the illustrated embodiment, the pusher member 174 can be angled at approximately 45 degrees relative to the lateral axis extending straight across the vehicle 142. As shown, the pusher member 174 can have a curvature that generally conforms to a forward edge of the bumper beam 48. In the illustrated embodiment, the pusher member 174 rests nearly flush against the bumper beam 48, and particularly the first lateral portion 56 and at least part of the apex portion 62.

The active pusher assembly 172 can include an actuating piston 176 for forcibly moving the pusher member 174 to the protruding position when a front-end offset crash event occurs. The actuating piston 176 can be one of a hydraulic piston or a pneumatic piston, for example. In the illustrated embodiment, the actuating piston 176 includes a stationary portion 178 fixed to the frame assembly 140, and particularly the bumper beam 48, and includes a moveable portion 180 which telescopingly projects from the stationary portion 178. A distal end of the moveable portion 180 is pivotally secured to the pusher member 174 via journal or pivot 182. Specifically, the moveable portion 180 is pivotally secured to the pusher member 174 by the pivot 182 adjacent a protruding end 174a of the pusher member. A non-protruding end 174b of the pusher member can be pivotally secured to the outer lateral end 56a of the first lateral portion, though other arrangements could be employed. The actuating piston in 176 supplies a powered moving force of the pusher member 174 when a front corner to front corner collision even (i.e., a front-end offset crash event) is detected.

In operation, the active pusher assembly 172 functions in conjunction with the asymmetrical bumper beam 48 to facilitate the vehicle 142 and a colliding vehicle 50 from locking with one another. The active pusher assembly 172 functions to "push" the other car 50 away and/or pushes the vehicle 42 away from the vehicle 50. This further facilitates prevention of the two vehicles 142, 50 from locking with one another during a collision event, which would otherwise prevent relative sliding motion between the vehicles 142, 50 from occurring.

Figure 6:
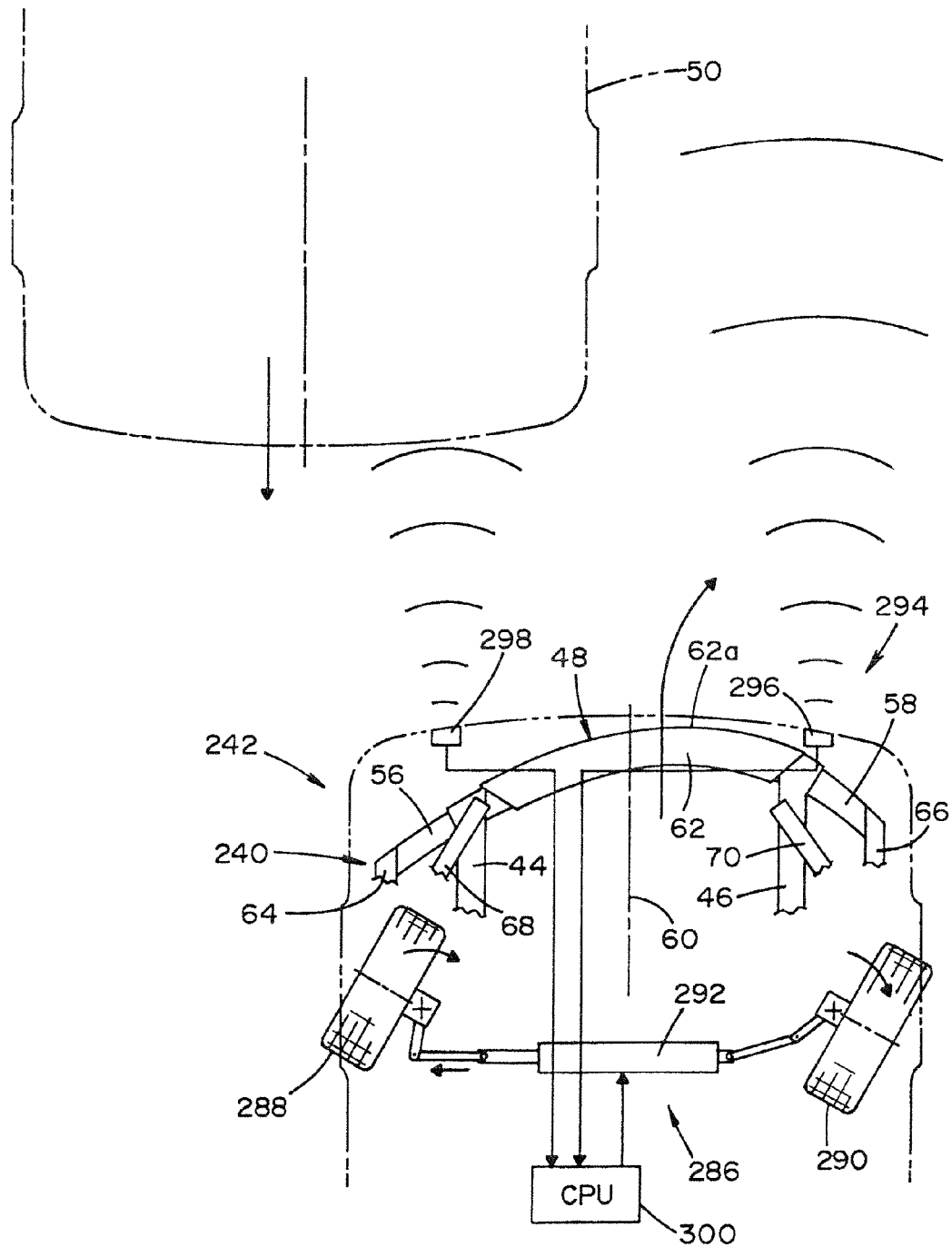
FIG. 6 is a schematic view of a front end portion of a vehicle frame assembly having an asymmetrical profile and an active steering system for steering away from a detected collision event with another vehicle.

With reference to FIG. 6, still another collision mitigation system is illustrated including a collision mitigating frame assembly 240 of a vehicle 242. Except as described hereinbelow, the frame assembly 240 can be the same as the frame assembly 40 of FIGS. 2-3 and thus like reference numerals are used to identify like components. For example, the frame assembly 240 can include first and second spaced apart side frame members 44, 46 extending longitudinally along opposite lateral sides of the vehicle 242. Asymmetrical bumper beam 48 extends across forward ends of the first and second lateral portions 56, 58. As already described herein, the asymmetrical bumper beam 48 is configured to redirect collision energy away from the vehicle 242 during a front corner to front corner collision event (i.e., a front-end offset crash event) between the vehicle 242 and another vehicle 50.

Unlike the frame assembly 40, the collision mitigation system of FIG. 6 includes an active steering system 286 for steering the vehicle 242 away from a collision event. The active steering system 286 can include at least one wheel rotatably secured to the side frame members 44, 46, such as steerable wheels 288, 290 in the illustrated embodiment of FIG. 6. The active steering system 286 further includes a powered steering unit 292 for powered steering of the wheels 288, 290 in a detection system 294 for detecting a probable collision event, such as a front-end offset crash event between the vehicle 242 and another vehicle, such as vehicle 50. The detection system 294 can include proximity sensors, such as sensors 296, 298, for detecting an imminent crash and for detecting other obstacles (e.g., other vehicles, trees, telephone poles, etc.) for purposes that will be described hereinbelow.

A controller 300 can be operatively connected to the power steering unit 292 and to the detection system 294, such as to the sensors 296, 298. When appropriate, the controller 300 can command the powered steering unit 292 to power steer the wheels 288, 290 away from a detected collision event when the detection system 294 via the sensors 296, 298 detects a probable collision event. As already mentioned, the detection system 294 can be configured to detect not only a probable collision event but also other obstacles. The controller 300 can be specifically configured to command the powered steering unit 292 to steer the wheels 288, 290 when the detection system detects a probable collision event without steering the vehicle 242 into the other detected obstacles.

Though not illustrated, the collision mitigation system and frame assembly 240 of FIG. 6 could further include the active pusher assembly 172 described in reference to FIGS. 4 and 5. In this case, the controller 300 could also be operatively connected to the piston 176 for commanding the piston 176 to move the pusher member 174 to its protruding position when the detection system 294 detects an anticipated collision event.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A collision mitigation system for a vehicle having a frame assembly comprising:
   a pair of frame members extending longitudinally along opposite lateral sides of the vehicle;
   a bumper beam extending between forward end portions of said pair of frame members, said bumper beam having a curved asymmetrical profile for guiding movement of the vehicle during a front-end offset crash event, said bumper beam having a first lateral portion adjacent to and immediately forward of said forward end portion of a first one of said pair of frame members, and a second lateral portion adjacent to and immediately forward of said forward end portion of a second one of said pair of frame members, wherein said first lateral portion is longitudinally spaced behind said second lateral portion.

2. The frame assembly of claim 1 wherein said first lateral portion is directed laterally into the vehicle at a greater angle than said second lateral portion is directed laterally into the vehicle.

3. The frame assembly of claim 2 wherein said first lateral portion is directed laterally into the vehicle at an angle of between about 50 to about 60 degrees and said second lateral portion is directed laterally into the vehicle at an angle of between about 40 to about 50 degrees.

4. The frame assembly of claim 3 wherein said first lateral portion is directed laterally into the vehicle at an angle of about 55 degrees and said second lateral portion is directed laterally into the vehicle at an angle of about 45 degrees.

5. The frame assembly of claim 1 wherein said bumper beam defines an apex portion between said lateral portions that is offset laterally relative to a longitudinal center line of the vehicle, the apex creating the curved asymmetrical profile of the bumper beam.

6. The frame assembly of claim 5 wherein said apex portion is offset laterally in a direction away from a driver's side of the vehicle.

7. The frame assembly of claim 1 further including an active pusher assembly including a pusher member movably attached to said bumper beam that moves toward a protruding position during said crash event to push away an impacting vehicle.

8. The frame assembly of claim 7 wherein said active pusher assembly includes an actuating piston that forcibly moves said pusher member to said protruding position.

9. The frame assembly of claim 8 wherein said actuating piston is one of a hydraulic piston or a pneumatic piston.

10. The frame assembly of claim 1 further including an active steering system for steering the vehicle away from said collision event.

11. The frame assembly of claim 10 wherein said active steering system includes:
   at least one wheel rotatably secured to said pair of frame members;
   a powered steering unit for powered steering of said at least one wheel;
   a detection system for detecting a probable collision event; and
   a controller for commanding said powered steering unit to power steer said at least one wheel when said detection system detects a probable collision event.

12. The frame assembly of claim 11 wherein said detection system is configured to detect said probable collision event and to detect other obstacles, said controller is configured to command said powered steering unit to steer said at least one wheel when said detection system detects a probable collision event without steering the vehicle into said other obstacles.

13. A collision mitigation system for redirecting collision energy, comprising:
   first and second spaced apart frame members extending longitudinally along opposite lateral sides of a vehicle;
   an asymmetrical bumper beam extending across forward ends of said first and second spaced apart frame members, said asymmetrical bumper beam configured to redirect collision energy away from the vehicle during a front corner to front corner collision event between the vehicle and another vehicle, said asymmetrical bumper beam having an apex portion offset laterally from a longitudinal center line of the vehicle.

14. The collision mitigation system of claim 13 wherein said asymmetrical bumper beam has a first lateral portion of said bumper beam extending from one end of said apex portion and having a shallow angle or a larger radius of curvature, and a second lateral portion of said bumper beam extending from another end of said apex portion and having a steep angle or a smaller radius of curvature.

15. The collision mitigation system of claim 14 wherein an outer lateral end of said first lateral portion is longitudinally recessed relative to an outer lateral end of said second lateral portion.

16. The collision mitigation system of claim 14 further including an active pusher assembly having a movable pusher member that is selectively movable between a rest position and a protruding position wherein said pusher member protrudes from said first lateral portion and is oriented at an angle relative to a lateral axis across the vehicle.

17. The collision mitigation system of claim 16 wherein said active pusher assembly includes a hydraulic or pneumatic piston for powered moving of said pusher member when said front corner to front corner collision event is detected.

18. The collision mitigation system of claim 17 further including:
   at least one steerable wheel rotatably connected to one or both of said first and second frame members;
   a powered steering unit for steering of said at least one steerable wheel;
   a detection system for detecting said collision event; and
   a controller operatively connected to said powered steering unit, said piston and said detection system for commanding said powered steering unit to steer said at least one steerable wheel away from said collision event and for commanding said piston to move said pusher member to said protruding position when said detection system detects said collision event.

19. A collision mitigation system for a vehicle, comprising:
   an asymmetrical bumper beam extending between forward ends of laterally spaced apart frame members, said asymmetrical bumper beam configured to redirect collision energy away from the vehicle during a front corner to front corner collision event between the vehicle and another vehicle;
   an active pusher assembly having a movable pusher member that is selectively movable between a rest position and a protruding position wherein said pusher member protrudes from said bumper beam;
   at least one steerable wheel rotatably connected to at least one of said frame members;
   a powered steering unit for steering of said at least one steerable wheel;
   a detection system for detecting said collision event; and
   a controller operatively connected to said powered steering unit, said active pusher assembly and said detection system, said controller configured to command said powered steering unit to steer said at least one steerable wheel away from said collision event and to command said active pusher assembly to move said pusher member to said protruding position when said detection system detects said collision event.

* * * * *